March 6, 1934.  C. WILLARD  1,949,850
AUTOMOBILE HOOD LOCK
Filed June 22, 1933
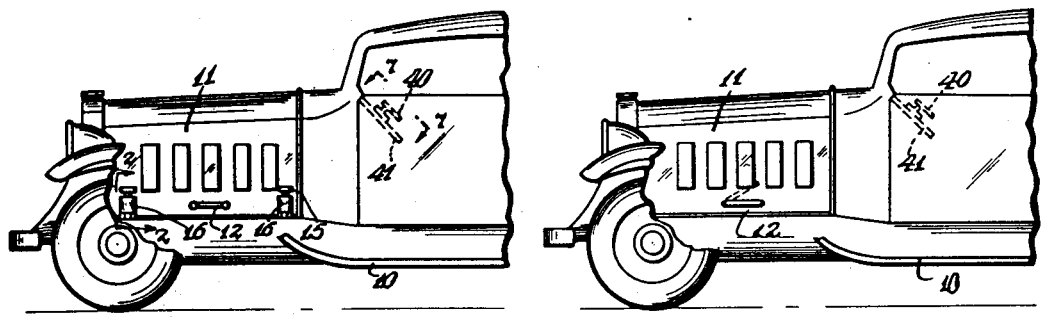
Fig. 1.  Fig. 9.
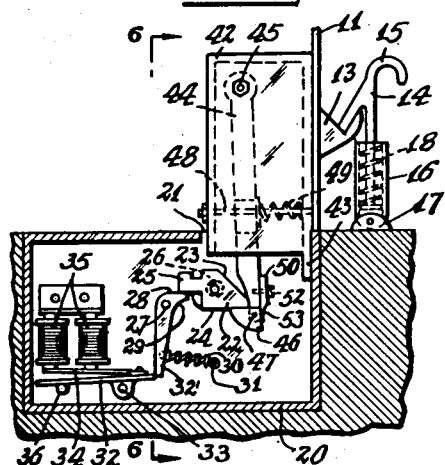
Fig. 2.
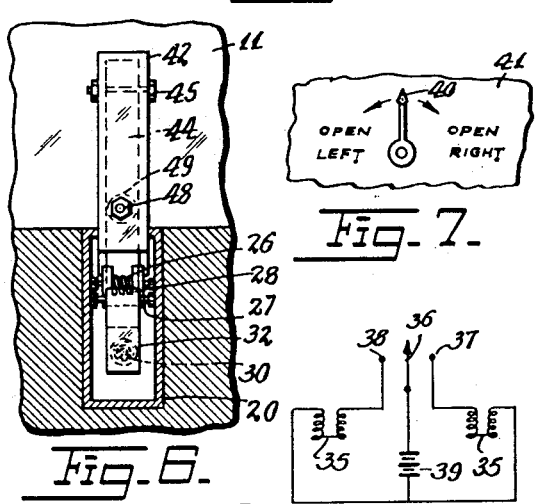
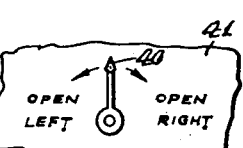
Fig. 7.
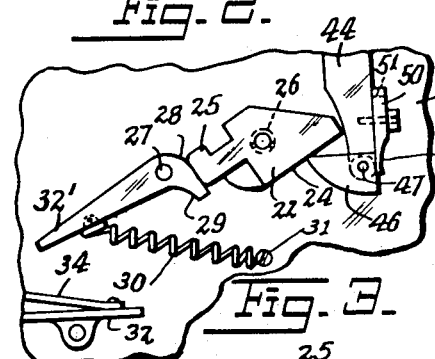
Fig. 3.
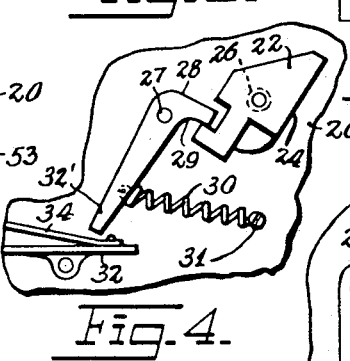
Fig. 4.
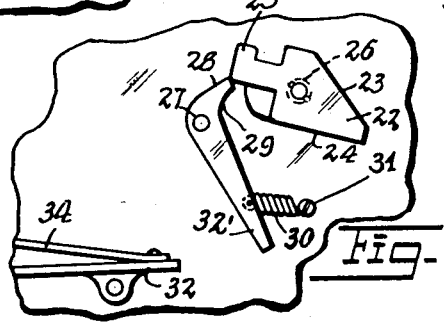
Fig. 5.
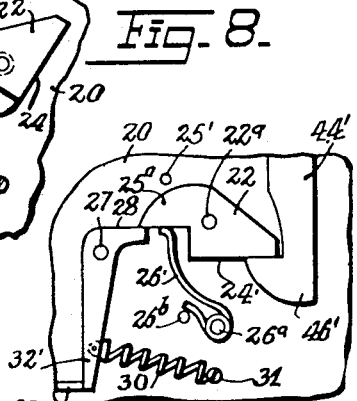
Fig. 10.
INVENTOR
CHARLES WILLIARD
BY
ATTORNEY Patented Mar. 6, 1934

1,949,850

UNITED STATES PATENT OFFICE 1,949,850

AUTOMOBILE HOOD LOCK

Charles Willard, New York, N. Y.

Application June 22, 1933, Serial No. 676,993

5 Claims. (Cl. 70—52)

This invention relates to new and useful improvements in an automobile hood lock.

The invention has for an object the construction of an automobile hood lock which is characterized by an arrangement whereby the hood of an automobile may be automatically locked closed when it is closed, which lock when so adjusted may only be released by operating mechanism upon the dash board of the vehicle.

Still further the invention proposes a novel arrangement whereby a bolt mechanism is mounted upon the hood and is adapted to engage in a lock mechanism mounted upon the chassis of the vehicle for the purpose of locking the hood closed.

As another object of this invention it is particularly proposed to arrange the locking mechanism with a keeper member which is pivotally mounted within a casing and adapted to engage and hold the bolt from the bolt mechanism, and to arrange the keeper member to have a novel operation in conjunction with a controller member and an armature stop.

Still further the invention proposes arranging the controller member and the keeper member in such a manner that as the keeper member moves to the open position it engages beneath a portion of the controller member so that upon subsequent return to a neutral position it causes the automatic latching of the controller member in its operative position.

Still further the invention contemplates the provision of an electro-magnet adapted to move the armature stop which controls the controller member and so control the opening of the lock.

Furthermore the invention contemplates arranging the bolt in a novel manner so that it may move sidewise during its engagement into the lock whereby it may engage the keeper member for accomplishing locking of the hood.

As another object of this invention an arrangement is proposed whereby a member with a portion thereof resilient, is adapted to adjustably move upon the bolt in a manner so that the head of the bolt may be rigid, or flexible to any desirable degree, all arranged so that when the head is rigid the bolt will coact with the lock for maintaining the hood latch closed, and when flexible to desired degrees, will permit opening of the hood under various stresses.

Still further the invention proposes the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure,

Fig. 1 is a fragmentary side elevational view of a motor vehicle having a hood, and equipped with a hood lock according to this invention.

Fig. 2 is a fragmentary enlarged sectional view taken on the line 2—2 of Fig. 1.

Fig. 3 is a fragmentary view of a portion of Fig. 2 illustrating the keeper member and the controller member in a different position, a position in which the keeper member is moving towards its fully open position.

Fig. 4 is another view similar to Fig. 3 but illustrating the keeper member returning to its latching position and moving the controller member back to its latching position.

Fig. 5 is another view similar to Fig. 3 but illustrating the controller member in the act of being released from the keeper member so as to engage beneath a portion thereof to lock the keeper member in position.

Fig. 6 is a sectional view taken on the line 6—6 of Fig. 2.

Fig. 7 is a fragmentary elevational view of a portion of the dash board of the vehicle seen as though looking in the direction of the line 7—7 of Fig. 1.

Fig. 8 is a schematic wiring diagram of the device.

Fig. 9 is a view similar to Fig. 1 but illustrating a vehicle which is not provided with hand operated catches for aiding in holding the hood closed.

Fig. 10 is a fragmentary view similar to Fig. 2 but showing another form of the invention.

In Fig. 1 an automobile 10 has been illustrated which is provided with a conventional hood 11 having a handle 12 by which it may be raised and lowered. This hood is shown provided with a pair of catch members adapted to hold the hood in a releasable closed position. These catch members comprise hook elements 13 attached upon the side of the hood and engageable with a hook bolt 14 resiliently mounted. Each of the bolts 14 are provided with handles 15 by means of which they may be operated. The inner ends of the members 14 slidably engage within the casings 16 which are pivotally mounted on their lower ends upon lugs 17 on the chassis of the vehicle. Springs 18 are arranged within the casings 16 and act between the casings and the bolts 14 for normally urging the latter elements downwards so as to hold the hood in the closed position.

The invention consists in a novel arrangement of an automobile hood lock whereby the hood of the vehicle may be held closed and locked without interference from the hand operated catches. In Fig. 9 an automobile has been disclosed which is absolutely similar to the one shown in Fig. 1 except that it is not provided with the hand operated catches. Each of these vehicles are provided with the hood lock according to this invention.

The hood lock comprises a bolt mechanism attached upon the hood or chassis of the vehicle and adapted to engage with a lock mechanism attached upon the other of the two mentioned parts. As illustrated on the drawing the bolt mechanism is shown attached upon the hood while the lock mechanism is mounted upon the chassis of the vehicle.

The latter mechanism according to this invention comprises a casing 20 which is embedded or mounted within a portion of the chassis of the vehicle and which has an opening 21 at the top through which the bolt from the bolt mechanism may engage. A keeper member 22 for holding the bolt is pivotally mounted within the casing 20 and has a top beveled side 23 for moving an inserted bolt sidewise so that the bolt may reach a locking position. The top beveled edge 23 connects with a bottom substantially straight side 24 which is for holding the inserted bolt against retraction. The exact operation of the bolt in conjunction with the keeper member will be gone into further later on in this specification. The keeper member 22 is also provided with a side finger 25.

Resilient means is provided for normally urging the keeper member into a neutral latching position. This resilient means comprises a coil spring 26 mounted upon the pivot of the keeper member and acting between the casing 20 and the keeper member so as to normally urge the keeper member in the position stated. This position is illustrated by the full lines in Fig. 2. In Fig. 5 the keeper member is also shown substantially in its neutral latching position. A controller member is provided in conjunction and for cooperation with the keeper member and is pivotally mounted intermediately at the point 27 also upon the casing. This controller member is provided with a top surface 28 adapted to engage beneath the side finger 25 to hold the keeper member latched. The top surface 28 connects directly with a bottom surface 29 by reason of a sharp point at the junction between these surfaces. The bottom surface is engageable by the side finger 25 as the keeper member 22 pivots from the open to the latched position to move the controller member into its latched position. The controller member has a bottom tail end 32'. A resilient means in the form of a spring 30 is arranged for normally urging the controller member into its open position. This spring 30 is attached at one end upon the controller member and at the other end upon a pin 31 mounted upon a casing 20.

An armature stop 32 is arranged in conjunction with the controller member and is adapted to engage the tail portion 32' of the controller member to hold the latter member in its latched position. The armature stop 32 is pivotally mounted intermediate of its ends at the point 33 upon the casing. A flat spring 34 is attached upon the top side of the armature stop and engages against the bottom side of a magnet 35 so as to urge the armature stop downwards against a pin 36 which projects from the casing 20. The magnets when energized are adapted to attract the armature stop so as to pivot the stop to cause it to release the tail end 32' of the controller member.

The magnets 35 are connected in a circuit terminating in a switch 36 mounted upon the dash board 41 of the vehicle. This switch is provided with a positive movable contact engageable against a stationary contact 37 or another stationary contact 38 depending upon the direction it is moved. The potential elements 36 are connected with a source of current such as a battery 39. In Fig. 8 a second electro-magnet 35 has been shown arranged in a circuit so that one of the electro-magnets 35 is in a closed circuit when the switch 36 is moved to connect with the contact 33 and the other is in a closed circuit when the switch 36 is moved to connect with the contact 38. It is proposed that a duplicate mechanism to that illustrated in Fig. 2 be arranged upon the opposite side of the hood 11 so that both sides of the hood may be latched and released when desired. It is proposed to arrange the controller element 36 and its contact with a handle 40 upon the dash board 41 of the vehicle in a manner so that it may be moved in one direction, for example towards the right to open the right side of the hood 11 or in the other direction towards the left to open the left side of the hood. Inscriptions of this effect are placed upon the dash board 41 as may be seen in Fig. 7.

The bolt mechanism according to this invention comprises a casing 42 which is attached upon the inside of the hood 11. This casing is open at the bottom end and is so located that when the hood is in the closed position, the lower portion of the casing extends a small distance into the casing 20 clearly illustrated in Fig. 2, which arrangement prevents the possibility of a tool being inserted between the lower edge of the hood and the chassis for the purpose of prying open the bolt mechanism. A lip 43 projects from the front side of the casing 42 and extends downwards so as to further insure against the insertion of a tool which is capable of moving the bolt of the bolt mechanism.

The bolt mechanism includes a bolt 44 which is pivotally mounted at its top end 45 within the casing 42. The lower end of the bolt is provided with a head 46 which is pivotally mounted thereon by a pintle pin 47. A resilient means is provided for normally urging the bolt 44 sidewise in one direction and comprises a guide rod 40 mounted upon the casing and extending through the opening in the bolt 44. A spring 49 connects between one side of the bolt and is arranged coaxially upon the guide rod 48 and also acts against the casing 42 so as to normally urge the bolt sidewise as desired. A member 50 is formed with an elongated slot 51 through which a head screw 52 passes and threadedly engages through the side of the bolt 44. This member has a reduced front end 53 of a resilient character and acts against one side of the head 46 so as to resiliently hold the head in its natural position. The arrangement is such that when the hood 11 is drawn upwards under sufficient force the head 46 of the bolt may pivot to release itself from the keeper member.

The degree of force necessary may be controlled by adjusting the position of the member 50. When this member is completely in its lowered position then the head 46 of the bolt will be completely rigid in that then a wide portion of the member 50 is immediately adjacent the side of the head 46. When the member 50 is in its lowered position then it is impossible to open the hood of the vehicle by depending upon the head of the bolt 46 moving. It is then necessary that the lock mechanism be operated to release the bolt.

The operation of the device may be understood by examining Fig. 2 and recognizing that it is the closed position of the lock. It should be noticed that the head portion 46 of the bolt 44 is engaged upon the bottom locking surface 24 of the keeper member. Assume the member 50 in its lower position. Then it is impossible for the hood to be raised except if the lock mechanism is operated. Upon closing of the switch 36 the electro-magnet 35 will be energized and lift the armature stop 32 to release the tail end 32' of the controller member which is immediately moved by the spring 30 slightly anticlockwise out from its latching position so that even though the armature stop 32 returns to its latching position the lock will be opened since the bottom of the tail end 32' is now above the armature stop 32 (in the neutral position as shown in Fig. 4) contrasted with before when engaging the edge of the armature stop.

It is now possible to lift up the hood 11. It should be noticed that as the hood 11 is lifted up, the keeper member 22 will pivot for example as illustrated in Fig. 3 and the finger portion 25 of the keeper member will press against the top surface 28 of the controller member and pivot the controller member further backwards than its natural position which it assumes under the action of the spring 30. When the bolt 44 has been completely withdrawn from the lock mechanism, the keeper member 22 will have been pivoted so far that the side finger 25 will move beneath the tip of the controller member and be located against the bottom surface 29 as illustrated in Fig. 4.

When the bolt has been completely released the keeper member 22 is free and the spring 26 will immediately pivot it back to its neutral latching position. This position is illustrated in Fig. 5. As the keeper member 22 moves to this position the finger 25 acting against the bottom side 29 of the controller member will pivot the controller member into the position illustrated in Fig. 5, and then upon very slight additional motion of the keeper member the controller member will be released and the spring 30 which is now under compression will immediately move it into its original position, that is, its latching position illustrated in full lines in Fig. 2, in which position its tail 32' engages against the edge of the armature stop 32.

The hood is now open, and to again lock the hood it is necessary that it be moved downwards into its closed position. As the hood moves downwards the inclined side of the hood 46 will strike against the inclined side 23 of the keeper member. The spring 26 is capable of holding the keeper member 22 relatively stationary in that it is much stronger than the spring 49 and consequently as the hood is moved downwards the bolt 44 will be compelled to move sidewise compressing the spring 49. When the bolt has been sufficiently extended so that the head 46 is completely beneath the point of the keeper member then the spring 49 will move the bolt 44 in the other direction so as to cause the head 46 to engage the bottom straight latching surface 24 of the keeper member. The device is now back in its original latched position.

In Fig. 10 a modified form of the device has been disclosed in which a bolt and the controller member are slightly differently constructed. Only a fragmentary portion of the device has been shown illustrating the changes, the other parts not shown are identical to the previous form. More particularly the device is shown provided with a bolt 44' which has a head 46' of one integral piece therewith. The head of the bolt is adapted to engage against straight bottom side 24' of a keeper member 22' which is pivotally mounted at the point 22 and upon the casing 20.

The keeper member 22' is formed with a side finger 25ª adapted to engage against the straight top 28 of the controller member. The controller member is constructed identical to that shown in the previous form. Another variation from the previous form is in the resilient arrangement for urging the keeper member 22' into its neutral locking position. Instead of the coaxial spring arranged upon the pivot, this form teaches the provision of a spring 26' having one end engaging against the keeper member 22', and having an intermediate portion curled upon a pin 26ª mounted upon the casing 20, and having its other end acting against a pin 26ᵇ also mounted upon the casing 20. The spring serves to urge the keeper member 22' into its neutral position.

The operation of this device is identical to that previously described. When the element 32 releases the controller member, the spring 30 will slightly pivot the controller member into a free position. Then the bolt 44' may be withdrawn vertically. The keeper member and the controller member will pivot and act as previously described. A pin 25' also projects from the casing 20 to prevent the keeper member 22 from moving completely free from the action of the spring 26'.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A lock for automobile hoods and the like, a casing with an opening for the insertion of a bolt, a keeper member for holding the bolt and pivotally mounted in said casing and having a top beveled side for moving the inserted bolt sidewise and connecting with a bottom straight catch side for holding the inserted bolt against retraction and also having a side finger, resilient means urging said keeper member into a neutral latching position, a controller member pivotally mounted in said casing and having a head portion with a top surface adapted to engage beneath said side finger to hold the keeper member latched and the top surface connecting with a bottom surface engageable by said side finger as the keeper pivots from the open to the latched position to move said controller member into its latched position, resilient means urging said controller into its open position, an armature stop adapted to engage the tail portion of the controller member to hold the controller member in its latched position, and a magnet to move said armature stop to a releasing position.

2. A lock for automobile hoods and the like, a casing with an opening for the insertion of a bolt, a keeper member for holding the bolt and pivotally mounted in said casing and having a top beveled side for moving the inserted bolt sidewise and connecting with a bottom straight catch side for holding the inserted bolt against retraction and also having a side finger, resilient means urging said keeper member into a neutral latching position, a controller member pivotally mounted in said casing and having a head portion with a top surface adapted to engage beneath said side finger to hold the keeper member latched and the top surface connecting with a bottom surface engageable by said side finger as the keeper pivots from the open to the latched position to move said controller member into its latched position, resilient means urging said controller into its open position, an armature stop adapted to engage the tail portion of the controller member to hold the controller member in its latched position, and a magnet to move said armature stop to a releasing position, the resilient means for urging said keeper member comprising a spring mounted upon the pivot of said keeper member and acting between the keeper member and said casing.

3. A lock for automobile hoods and the like, a casing with an opening for the insertion of a bolt, a keeper member for holding the bolt and pivotally mounted in said casing and having a top beveled side for moving the inserted bolt sidewise and connecting with a bottom straight catch side for holding the inserted bolt against retraction and also having a side finger, resilient means urging said keeper member into a neutral latching position, a controller member pivotally mounted in said casing and having a head portion with a top surface adapted to engage beneath said side finger to hold the keeper member latched and the top surface connecting with a bottom surface engageable by said side finger as the keeper pivots from the open to the latched position to move said controller member into its latched position, an armature stop adapted to engage the tail portion of the controller member to hold the controller member in its latched position, and a magnet to move said armature stop to a releasing position, said resilient means for urging said controller into its open position, comprising a spring attached at one end upon the controller member and at the other end upon a pin projecting from said casing.

4. A lock for automobile hoods and the like, a casing with an opening for the insertion of a bolt, a keeper member for holding the bolt and pivotally mounted in said casing and having a top beveled side for moving the inserted bolt sidewise and connecting with a bottom straight catch side for holding the inserted bolt against retraction and also having a side finger, resilient means urging said keeper member into a neutral latching position, a controller member pivotally mounted in said casing and having a head portion with a top surface adapted to engage beneath said side finger to hold the keeper member latched and the top surface connecting with a bottom surface engageable by said side finger as the keeper pivots from the open to the latched position to move said controller member into its latched position, resilient means urging said controller into its open position, an armature stop adapted to engage the tail portion of the controller member to hold the controller member in its latched position, and a magnet to move said armature stop to a releasing position, a flat spring being mounted upon said armature stop and acting against said magnet so as to urge the armature stop into its latching position.

5. In an automobile hood lock or other similar lock, a bolt mechanism comprising a casing, a bolt pivotally mounted within said casing and projecting therefrom and adapted to engage into an opening in the casing of a lock mechanism, said bolt having a beveled portion adapted to engage a beveled portion upon a portion of the lock mechanism to cause the bolt to move sidewise, and resilient means opposing the sidewise motion of said bolt, said bolt having a head portion pivotally mounted upon the main portion of said bolt, a member adjustably mounted upon said bolt and having a gradual reducing end engaging said head portion so as to normally hold the head portion in operative positions, and said member being adjustable to oppose a substantially non-resilient portion against the head of the bolt to prevent pivoting.

CHARLES WILLARD.